UNITED STATES PATENT OFFICE.

JEAN GAA, OF BASLE, SWITZERLAND.

COMPOUND FOR CLOSING PUNCTURES IN PNEUMATIC TIRES.

SPECIFICATION forming part of Letters Patent No. 616,459, dated December 27, 1898.

Application filed December 29, 1897. Serial No. 664,399. (No specimens.)

*To all whom it may concern:*

Be it known that I, JEAN GAA, a citizen of the Swiss Republic, residing at Basle, Switzerland, have invented certain new and useful Improvements in Compounds for Closing Punctures in Pneumatic Tires; and I do hereby declare the following to be a full, clear, and exact description of the same.

My invention relates to means for repairing breaks in pneumatic tires, and has for its object to provide a reliable and inexpensive method whereby punctures of pneumatic tires of bicycles and other vehicles, which have been caused by knives, thorns, pieces of glass, and similar bodies, being so disagreeable to the rider, can be closed again in the most simple manner, as hereinafter more fully described, and definitely set forth in the claim.

In providing the tube interiorly with certain solid or semisolid bodies suspended in a suitable liquid these bodies will, under the influence of atmospheric pressure, readily close any opening from the outside, so that the rider can continue at once on the road. With this object in view I have tested a number of resins, such as gum-arabic and gutta-percha and such others as can be employed in the form of an emulsion. Shellac can also be used after precipitating the same in the form of gelatin from its solution by means of glycerin or hydrates of carbon, or a mixture of both. In the same manner vegetal or animal cellulose may be employed in a suitable disintegrated state, as well as membrane gum, and gutta-percha, either raw or tanned or precipitated from its alkaline solution. These latter bodies can be treated with a suitable liquid, which in all circumstances must contain glycerin for maintaining the tube in a non-drying state and for preserving the elasticity of the same, especially when it has been stored for a long period and also during the winter. This preparation is done, preferably, by boiling under pressure, whereupon the material is brought through a valve-opening into the hose. I may also introduce a certain quantity of said bodies through an opening in the hose into the latter and then add the liquid through the valve before the vehicle is made ready for use. In the latter case motion of the wheel is necessary for a longer period of time before the solid bodies acquire the necessary plastic properties.

First. I take thirty kilos of an alkaline ten-per-cent. shellac solution, which I mix with a solution of thirty kilos of glycerin, ten kilos of dextrine, and ten kilos of gum in forty kilos of water, stirring the mixture rapidly, the mixture being at first quite liquid and is then stirred or shaken up until such time when it takes the shape of gelatin.

Second. I take ten kilos of pulverized ammoniac gum, to which I add ten kilos of powdered gum and twenty kilos of water, forming of the whole an emulsion. Then I add to the said emulsion twenty kilos of glycerin. In place of ammoniac gum galvanum or a solution of gutta-percha may be employed.

Third. Twenty kilos of cellulose are boiled with a solution or one hundred kilos of gum in four hundred kilos of water for five to six hours, preferably under pressure. The liquid is then evaporated, so that three hundred kilos alone remain. Thereupon one hundred kilos of glycerin and one hundred kilos of dextrine are added. The cellulose may be substituted by an equivalent quantity of one of the above-mentioned bodies. The proportions indicated in this example may of course be varied without departing from the nature of my invention.

I have found also that it is practical to employ a mixture of the means set forth in the above examples. The gum may be substituted by other suitable bodies, such as casein, glue, and the like.

Having thus described my invention, I claim—

A composition of matter for automatically repairing pneumatic tires, consisting of an emulsion formed of ten parts of pulverized ammoniac gum, ten parts of powdered gum, and twenty parts of water, suspended in twenty parts of glycerin, substantially as described.

In witness whereof I have hereunto set my hand in presence of two witnesses.

JEAN GAA.

Witnesses:
GEORGE GIFFORD,
JACOB RÜHM.